United States Patent
Busse et al.

(10) Patent No.: US 8,803,059 B2
(45) Date of Patent: Aug. 12, 2014

(54) SENSOR FOR DETERMINATION OF THE INCIDENCE ANGLE OF RADIATION AND METHOD FOR MEASUREMENT THE INCIDENCE ANGLE USING SUCH A SENSOR

(75) Inventors: Erik Busse, Altenburg (DE); Wilhelm Prinz von Hessen, Radebeul (DE)

(73) Assignee: Silicon Micro Sensors GmbH, Dresden (DE)

( * ) Notice: Subject to any disclaimer, the term of this patent is extended or adjusted under 35 U.S.C. 154(b) by 186 days.

(21) Appl. No.: 13/334,219

(22) Filed: Dec. 22, 2011

(65) Prior Publication Data

US 2012/0160992 A1   Jun. 28, 2012

(30) Foreign Application Priority Data

Dec. 23, 2010   (DE) .......................... 10 2010 064 140

(51) Int. Cl.
*G01C 21/00* (2006.01)
(52) U.S. Cl.
USPC ....................................... 250/208.1; 136/246
(58) Field of Classification Search
USPC ...................................................... 250/208.1
See application file for complete search history.

(56) References Cited

U.S. PATENT DOCUMENTS 7,177,178 B2 * 2/2007 Daughton et al. ............ 365/158
7,940,380 B1 * 5/2011 Benner, Jr. .................... 356/138

FOREIGN PATENT DOCUMENTS

DE    3730123 A1    2/2009
JP    2003067964 A  3/2003

OTHER PUBLICATIONS

European Search Report for EP 11194849.3 dated Apr. 24, 2012.

* cited by examiner

*Primary Examiner* — Tony Ko
(74) *Attorney, Agent, or Firm* — Heslin Rothenberg Farley & Mesiti P.C.

(57) ABSTRACT

A sensor and a corresponding method for the determination of the incidence angle of a radiation source are provided. The sensor has a diode assembly of avalanche photodiodes in a semiconductor layer and an application specific integrated circuit, a distance layer, an aperture structure located on the distance layer, and contacts for electrically connecting the sensor. The layers and structures are positioned directly on top of each other and match in their shape, size or thickness.

17 Claims, 2 Drawing Sheets

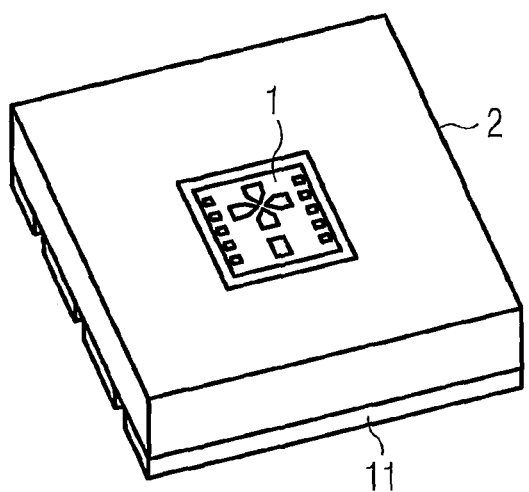
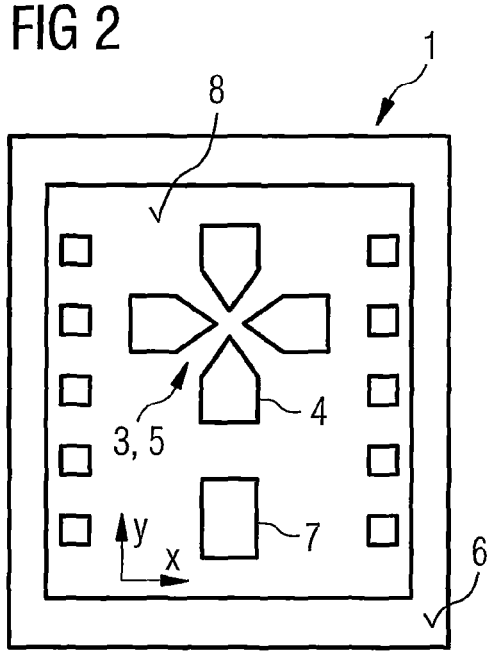

SENSOR FOR DETERMINATION OF THE INCIDENCE ANGLE OF RADIATION AND METHOD FOR MEASUREMENT THE INCIDENCE ANGLE USING SUCH A SENSOR

CROSS REFERENCE TO RELATED APPLICATIONS

This application claims priority of German application No. 10 2010 064 140.5 filed on Dec. 23, 2010, the entire disclosure of this application being hereby incorporated herein by reference.

BACKGROUND OF THE INVENTION

The invention refers to a sensor for the determination of the incidence angle of radiation, in the following designated as 'sensor', as well as a corresponding method for the determination of the incidence angle of a radiation source.

The determination of the position of radiation sources, in particular the position of the sun, in azimuth as well as in the elevation angle is an always persisting task, for whose realization various devices were used in the past and still in the present, which made use of either different transmissivity of materials for the radiation, or diffraction or refraction of the radiation to be measured in optically active materials, or a combination of these.

For the purpose of using the position data of radiation sources in a technical manner, devices and methods are required, that offer an appropriate precision of measurement as well as a simple and automatic processability of identified data. Areas of application for the technical utilization are, e.g. the automobile industry or building services engineering.

Most of the to-this-date technically used devices for this purpose comprise three main components: a photo sensitive surface for a spatially resolved detection of the radiation, a device for the modification of the incident radiation, and a unit for pre-processing the data.

Devices according to the state of the art offer no fully integrated solutions, but consist of separate parts.

Following the realization of the photo sensitive surface in older solutions through the arrangement of separate, and possibly spatially distributed photo elements, solutions with photo sensitive surfaces consisting of sensor arrays prevail subsequently, i.e. through a regular arrangement of light sensitive component, through which the incidence angle of the radiation is determined by determining whether a current is induced by photons or not. The WO 94/17427 describes such a sensor array, in which however the single cells only deliver digital responses. Thus, the resolution of these sensors is determined through the distance of the single cells within the sensor array. Using respective optical means such as converging lenses, the resolution is slightly improved; in addition, the use of a CCD image sensor is proposed. The use of separate optical auxiliary means such as lenses; however, do not allow one to design the sensor in a compact manner.

Additionally with using arrangements of photo sensitive cells, it is not beneficial if the cells are read out digitally. A higher resolution can be obtained if one can read out and evaluate the photo currents generated in the photo sensitive cells in an analogue way. Because of a small amount of currents, relatively bigger surfaces are however required for a detection of analogue data or for using the photo cell arrays to reduce the interference susceptibility of the measurement.

In the known systems, such a sensor has a complex design, and requires a bigger surface as well as an extensive evaluation.

SUMMARY OF THE INVENTION

The function of the invention is therefore to build a device for the determination of the incidence angle of a radiation source, that can be easily integrated into the apparatuses and devices of their respective area of application, has a very simple design, and minimizes the effort of evaluation despite a high spatial resolution. Additionally, a method shall be mentioned that determines the incidence angle using such a device, i.e. as well the azimuth $\alpha$ as the elevation angle $\beta$ of the incident radiation of a radiation source.

This function is performed via a sensor for the determination of the incidence angle of a radiation source, and a method for the determination of the incidence angle.

The sensor contains thereby in a semiconductor layer a semiconductor photodiode assembly, which forms in its entity a position sensitive detector (PSD), i.e. a detector that allows one to infer the location of the signal to be detected through the design and location of its elements. In this case, the diode assembly is characteristic of avalanche photodiodes that are used as semiconductor photodiodes. A single photon is sufficient to release an electron in avalanche photodiodes. This in turn triggers an avalanche effect through the acceleration by a field with a high field strength in the barrier layer. The impact ionization leads to a further generation of voltages. Therefore, an amplification of the effect by up to a hundred times takes place. Through this internal amplifying effect, it is now possible to detect even small changes in radiation. Because of this, it is in turn possible to detect the smallest changes in the incident radiation on the active surface of each of the avalanche photodiodes, which is the result of a change of the incidence angle of the radiation as it is amplified by the avalanche effect accordingly.

This enables the sensor to be minimized considerably as well in lateral direction as in its entity because to be able to detect a comparable change of the incidence angle similar to that of sensors according to the state of the art, a significantly smaller change of the radiated surface is sufficient because of the amplifying effect.

Also in this or a comparable semiconductor layer, the sensor according to the invention contains an application specific integrated circuit for producing analogue output signals that can be evaluated in a linear manner. This circuit enables the internal control of the sensor during the measurement to be carried out, the preparation and conversion of the measured signals, and the provision of a few, simple and reusable output signals . . . . These are in the sensor according to the invention two outgoing voltages, that mark the position of the geometrical focal point of the incident radiation, in order to guarantee that the main function can be carried out, i.e. the identification of the incidence angle of the radiation. Naturally in another embodiment of the sensor according to the invention, further output signals can be added.

On the semiconductor layer, there is a transparent second layer which serves the adjustment of a defined distance between the semiconductor layer, which contains the avalanche photodiodes that form the position sensitive detector, and an aperture structure placed on top of this, that according to the incidence angle of the incident radiation is imaged on the position sensitive detector. This transparent second layer is designated in the following as distance layer.

On the transparent distance layer, there is finally a aperture structure which is realized as a defined opening in a non-transparent layer, whereby the opening is arranged above the diode assembly and matches in regards to its shape and size the shape and size of the diode assembly as well as the thickness of the distance layer in such a way that the opening can always be imaged on the diode assembly in a position that is dependent on the incidence angle of the radiation. It also ensured that through matching shape, size and location of the diode structure, the thickness of the distance layer, and the shape and size of the aperture at both, an elevation angle of 90° of the incident radiation (also for a perpendicular incidence) and an elevation angle near 0° (whereby the angle cannot be 0°) as well as from any azimuth, an image of the through the aperture incident radiation on one part of the diode assembly is possible in such a way that through this, a position of the geometrical radiation focal point of this incident radiation is possible.

For electrically connecting the sensor and to enable an extraction of the data of the sensor to other external evaluation and control elements, the sensor further contains means for an electrical connection, i.e. areas that can be contacted such as contact pads.

It is of benefit therefore that the position sensitive detector consists of n pairs of avalanche photodiodes with n=1, 2, 3 etc., which are arranged in such a way, that the avalanche photodiodes are placed axially symmetrically relative to both axes x and y, which commonly span the plane of the photodiode assembly orthogonally to each other, and that the aperture structure depending on the incidence angle of the radiation can be imaged partly on the avalanche photodiodes of this diode assembly at any time. As the position of the geometrical focal point of the radiation incident through the aperture on the diode assembly can be determined through calculating the difference between the voltages obtained from the respective photocurrents at both sides of both axes x or y, an axially symmetrical similarity of the diode assembly on each side of an axis is of benefit. Additionally, only these avalanche photodiodes must be considered in the calculation which are clearly placed on one or the other side of the respectively considered axis.

At the same time, it is particularly beneficial if each of the paired up avalanche photodiodes is arranged in one of 2n sectors of the diode assembly, which spans around the geometrical focal point in a radial and regular manner, and whereby these avalanche photodiodes have separate, optically active surfaces of the same shape, same area and same distance from the centre of the diode assembly across a small, isolated bridge area as this allows one to make especially efficiently use of the surface available to the diode assembly, and to simplify the calculation of the position of the incident radiation even further.

In a particular simple and thus, advantageous embodiment, the sensor contains four avalanche photodiodes, of which at least one is arranged in one quadrant of the diode assembly and have a basic shape in plan view, which is assembled from an equilateral triangle of the side length a and a at the side length a of the triangle joining rectangular of the side length a and $\sqrt{(3)}/2*a$. Additionally, these four avalanche photodiodes according to the invention are arranged in such a way to each other that respectively the free tips of the equilateral triangles point towards each other, and the tips are as far away from each other that an electrical discharge from one avalanche photodiode to another is not possible. This allows a particularly good utilization of the surface of the diode assembly as well as a particularly simple evaluation of the voltages obtained from the four photocurrents for whose evaluation in respect to the used diodes a geometrical shape factor is not required. This assembly is also called assembly of quadrant photodiodes.

Through a respective embodiment of the avalanche photodiode assembly used for the determination of the direction of radiation and suitable choice of the opening of the aperture structure, it is possible in an advantageous embodiment of the sensor according to the invention to determine the total intensity of the incident radiation. In this case, this assembly is designed in such a way that a total surface of a same area to all avalanche photodiodes is irradiated by the radiation incident through the aperture. Thus, it is possible to measure the incidence angle of radiation as well as its intensity on one and the same sensor chip.

It is in particular useful for the determination of an objective brightness of the incident radiation when the sensor according to the invention contains a twilight sensor in addition to the diodes of the position sensitive detector, in case the sensor shall have means for an additional determination of the radiation intensity. This twilight sensor measures the objective brightness of the environmental radiation which can also be designated as interfering radiation. Thus, the determination of an absolute radiation intensity of the incident radiation that abstracts from the environmental influences is possible.

At the same time, the twilight sensor in one advantageous embodiment is provided with a blue filter. Taking into consideration its signal as well as the total intensity of the red sensitive position sensitive detector, the objective brightness can be determined as a result.

The use of a solution according to the invention, that monolithically integrates all light sensitive elements on a semiconductor device, enables one to minimize the size of the sensor even further. Thus, the sensor can also be installed in a space-saving manner, if necessary, it can be added to a system that already contains other sensors.

For their purpose respectively, two advantageous embodiments of the solution according to the invention are the sensor with a light sensitive element, such as the avalanche photodiodes and if required the twilight sensor, that is integrated monolithically on a semiconductor device, the application specific, integrated circuit and the means for an electrical connection, that are realized as contacts. This solution comprising one chip enables the application of a very simple production.

If however, the light sensitive elements are arranged on a first and the application specific, integrated circuit on a second semiconductor device, whereby the second semiconductor device is integrated in relation to the second semiconductor device in such a way that it is underneath the first and is contacted by the first device, it allows one to reduce the sensor in length and width further. Considering this solution, the means for an electrical connection can be arranged on the first and/or the second semiconductor device, whereby an arrangement on the first, upper device considerably facilitates the contacting using contact pads, whereas an arrangement on the lower device requires means for the respective electrical connection leading out to the edges of the device or rather beyond those.

An easy possibility of an embodiment of the transparent distance layer is by using a glass layer which is anodically bonded to the semiconductor layer. The use of borsilicate 33 or pyrex as glass material is optimal in this instance. Both materials are optimal for the anodiacally bonding to semiconductor materials, in particular to silicon.

The aperture structure, which is directly arranged on the transparent distance layer, is realized in a microsystem-technical manner through an opening in a non-transparent layer which during the production of the diodes is positioned relative to the diode surface using photolithographic means. For this purpose, positioning marks of the semiconductor wafer can be used on which the application specific circuits for the evaluation of the diode signals are realized. Such a positioning ensures a considerably higher precision than the application of shadow masks as separate parts that is according to the state of the art.

At the same time, a square-shaped opening of the aperture structure, that matches the size and arrangement of the avalanche photodiodes of the position sensitive detector, ensures an easy calculation of the position, and if required an easy determination of the total intensity, for which the impact of interfering factors can be minimized.

As an advantage, the sensor can have a casing for its protection from mechanical effects as well as climate influences such as humidity. This casing or at least part of the casing which is above the photodiodes is made transparent. A material whose use is of benefit in this instance is macrolon or aspec.

The method through which the incidence angle and/or the radiation intensity of a radiation source using the sensor as described above can be determined, is described in the following.

Both the diodes of the position sensitive detector and the twilight sensor of the sensor according to the invention if necessary are operated in the photovoltaic system, i.e. no Bias voltage is applied.

The photons of the radiation source that fall onto the assembly of photodiodes of the sensor through the opening of the aperture structure generate a photocurrent there. Through a specific design of the diodes of the position sensitive detector as avalanche photodiodes, during the conversion of photons into a photocurrent via impact ionaization, further charge carriers are generated. These amplify the signal of the incident photons by more than a hundred times. For this reason, even small changes can be detected.

These in the avalanche photodiodes generated photocurrents, that are proportional to the irradiated surface of the diodes, and the radiation intensity of the incident radiation are transformed into voltages because these photodiodes are operated in an appropriate mode. This can take place via a transimpedance amplifier.

Through transforming the photocurrents of the single photodiodes into voltages, which are equivalent to the photocurrents, a generation of internal as well as external well processed output signals is subsequently possible. Thus, the position (x,y) of the geometrical focal point of the incident radiation can be calculated respectively using the quotient of the differences and the sums of the in both directions x and y on both sides of the axes x or y corresponding to the their respective photocurrents calculated voltages.

Using these values, two continuous, electrical signals $A_x$ and $A_y$ that correspond to the position of the geometrical focal point (x,y) of the radiation on the position sensitive detector are generated in the sensor. At the same time, $A_x$ is the position of the geometrical radiation focal point in x-direction, and $A_y$ is the position of the geometrical radiation focal point in y-direction. As there are analogue output signals, i.e. continuous data, they ensure a high resolution of the position as well as a corresponding precision of the data calculated through these for further processing.

Through knowing the geometrical focal point (x,y) of the incident radiation, which is characterized by the electrical signals ($A_x$, $A_y$), the calculation of azimuth and the elevation angle in turn can take place. For this purpose, corresponding tangent relations are used.

In a very simple and thus, particularly advantageous embodiment of the method, for which a sensor with a position sensitive detector that has four avalanche photodiodes is used, the specific method of the determination of the incidence angle of a radiation source takes place as follows:

For the purpose to avoid the distortion of field lines and thus, non-linearity, that can occur with simultaneously reading out the photocurrents of all photodiodes of the position sensitive detector transformed through, e.g. a transimpedance amplifier, respectively opposite lying diodes are connected simultaneously while the other remain floated. Following a stabilization period, the connected diodes are read out and their voltage values $U_1$ and $U_3$ are stored.

Subsequently, the next couple of opposite lying diodes are connected simultaneously while in turn the remaining diodes are kept floated. Again following a stabilization period, these connected diodes are read out and their voltage values $U_2$ and $U_4$ are stored.

Again for the preferred design of the position sensitive detector, the electrical signal of the position x and y of the focal point of the incident radiation can be calculated using four photodiodes according to $x=(U_{III}-U_I)(U_I+U_{III})$ and $y=(U_{II}-U_{IV})/(U_{II}+U_{IV})$.

As demonstrated with the formula, x and y can take on values between −1 and 1 in this instance. Through subsequently calculating the electrical output signals $A_x$ and $A_y$ according to $$A_x=(x+1)*(U_{max}-U_{min})/2+U_{min}$$

and $$A_y=(y+1)*(U_{max}-U_{min})/2+U_{min},$$

whereby $U_{max}$ and $U_{min}$ are the upper and lower limit of the respectively permissible voltages of the electrical output signals, analogue values which clearly characterize the position of the incident radiation can therefore be generated, though which move within a fixed range ($U_{min} \ldots U_{max}$) and do not change their positive or negative signs, which considerably facilitates their transmission to, e.g. external evaluation and control units.

Using these electrical output signals, the calculation of the azimuth α and the elevation angle β according to $$\alpha = \arctan\frac{2Ay - U\min - U\max}{2Ax - U\min - U\max}$$

$$\beta = \arctan\frac{1}{\sqrt{\left(\frac{2(Ax-U\min)}{U\max-U\min}-1\right)^2 + \left(\frac{2(Ay-U\min)}{U\max-U\min}-1\right)^2}}$$

is possible. This calculation shall generally take place in an external evaluation unit which however shall not exclude the possibility to generate these values internally, i.e. in the sensor.

Further in an advantageous embodiment, the total intensity of the radiation on the position sensitive detector ($A_{PSD}$) can be calculated.

Making use of an additional twilight sensor on the sensor, which advantageously has a blue filter, and its measured radiation intensity ($A_{blue}$), a calculation of an objective brightness of a radiation source through switching off any interfering sources is possible by taking into consideration the output voltages $A_{blue}$ and $A_{PSD}$.

Again in a particularly advantageous embodiment of the method, for which a sensor according to the invention with a position sensitive detector that has four avalanche photodiodes is used, the total intensity of the radiation can be specifically calculated according to $A_{PSD}=(U_I+U_{II}+U_{III}+U_{IV})/4$ and/or the intensity of the radiation on the twilight sensor according to $A_{blue}=U_{blue}$.

Also these voltages $A_{PSD}$ and $A_{blue}$ are ideal for the transmission to an external evaluation and control unit as they in turn move within a fixed range and do not change their positive or negative signs.

BRIEF DESCRIPTION OF THE DRAWINGS

The invention shall be described further in the following by means of an embodiment of a as a sun sensor used sensor, which detects the current altitude of the sun in both spatial directions, and additionally if required, provides information about the radiation intensity of the incident sun radiation. At the same time likewise, the example arrangement is described as well as the method used, for instance for the detection of the incidence angle and the radiation intensity. The corresponding figures showing
FIG. 1: sensor chips in the package;
FIG. 2: a sensor in plan view.

DETAILED DESCRIPTION OF THE INVENTION

Figure 3:
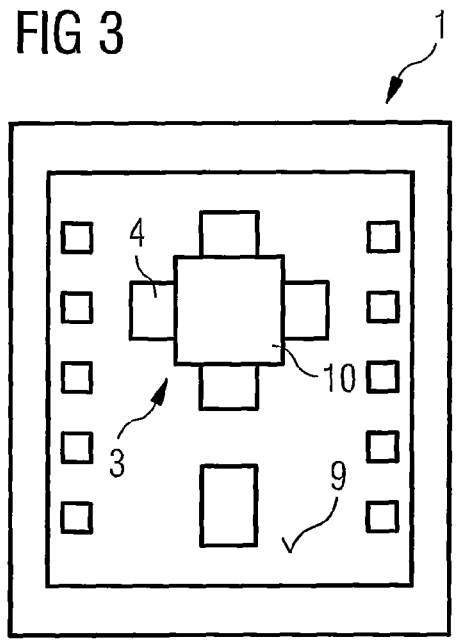
FIG. 3: a sensor in plan view with aperture structure

FIG. 1 shows an embodiment of a semiconductor device 11 according to the invention of a sensor 1 in its package 2, thus, in its casing. This package 2 is commonly inserted into a casing whose cap must be realized as a transparent cap above the photo diodes to protect the package from mechanical and climate influences. In the embodiment, the casing may optionally consist of macrolon or aspec, both of which are materials that have a sufficient transmission, and are sufficiently temperature resistant to make use of the sensor 1 in motor vehicles.

In an active semiconductor layer 6 of the semiconductor device 11, the sensor 1, as presented in FIG. 2, contains a monolithically integrated diode assembly 5 of four as avalanche photodiodes 4 realized semiconductor photodiodes, which when co-operating are used as position sensitive detector 3, a twilight sensor 7 as well as an application specific, integrated circuit (not visible in FIG. 2) for generating analogue output signals that can be evaluated. Through the amplifying effect of the avalanche photodiodes 4, a limitation of the active surface of used diodes to a very small area is possible. Thus, the surface required for sensor 1 can be considerably reduced: The embodiment of sensor 1 according to the invention has, for instance, the following dimensions, however is not limited to these: The size of the device as a whole is within the range of $2.5*3.5$ mm$^2$; at the same time, the active area of the position sensitive detector 3 is approximately $2*2$ mm$^2$; the area of the blue diode is $0.5*0.5$ mm$^2$ as well as the area of the evaluation electronics of approximately 2 mm$^2$. Through increased scaling, but dependent on the location it is used in, smaller dimensions are also possible.

The sensor 1 is based on the Silicon Pin Diode technology; it is diffusion stable at temperatures of 300 ... 500° C. during production.

The position sensitive detector 3 in the embodiment consists of a diode assembly 5 of four avalanche diodes 4 whose basic shape is assembled from an equilateral triangle of the lengths of a side length a, and a rectangular of the side length a joined at the side length of the triangle, and $\sqrt{(3)}/2*a$, that presents in this instance the optimal utilization of the provided area in combination with the selected aperture structure 9 and the requirement for a simple evaluability of the measured values. However, other basic shapes are also possible here. These four avalanche diodes 4 in turn are arranged to each other in such a way that respectively the free tips of the equilateral triangles are pointed towards each other, and each of the avalanche photodiodes 4 are rotated in relation to the previous one by 90° around the free triangle tip, whereby the tips in turn are as far away from each other that an electrical discharge from one diode to another is not possible.

Above the active semiconductor layer 6, there is a transparent layer, designated as distance layer 8, which in the described example are made of optionally pyrex or borosilicate 33, special glasses so to speak, that is anodically bonded to the active semiconductor layer 6, which contains the above described active elements. Especially for the system pyrex or borosilicate 33 on silicon, this is the material of choice to establish a connection.

On the distance layer 8, there is a aperture structure 9, whereby via the thickness of the distance layer 8, the distance between semiconductor layer 6 and the aperture structure 9 can be adjusted in a reproducible fashion. The aperture structure 9 and in particular its opening 10 or openings are positioned in a photolithographic manner relative to the diode surfaces of the position sensitive detector 3. During the manufacturing process, positioning marks of the silicon semiconductor wafer used for the production of the sensor 1 are used for this purpose. The aperture structure 9 contains in the presently described example a square opening 10 of the side length a, which is positioned centrally above the focal point of the position sensitive detector 3, as presented in FIG. 3. Commonly, this aperture structure should not be considered in a restricted manner: In this instance, other shapes of openings are also possible. However, the selected opening 10 is an example for a design, that allows one to determine the radiation intensity of the incident radiation because of the consequently always comparable size of the entire irradiated active surface of the four photo diodes 4 of the position sensitive detector 3, that is independent from the incidence angle. The determination of the radiation intensity in the described embodiment is required to be free of interfering signals, such as for instance light from the surrounding. For this purpose, the voltages generated from the photocurrent of the twilight sensor 7 equipped with a blue filter $A_{blue}=U_{blue}$, which is a standard measure for interferences from the surrounding, is determined in addition to the voltages of the four avalanche photodiodes 4 of the red-sensitive position sensitive detector 3, through which the radiation intensity of the incident radiation $A_{PSD}=(U_I+U_{II}+U_{III}+U_{IV})/4$ is described, generated by a transimpedance amplifier from photocurrents. The possible range of voltages to characterize radiation intensity of the incident radiation $A_{PSD}$ shall be 0.3 to 3.0 V in this instance; the possible range of voltage for characterization of the radiation intensity of the interference values $A_{blue}$ shall be 0.5 to 4.5 V. Taking into consideration the voltage of the twilight sensor 7, the radiation intensity of the incident radiation that is freed of interferences can be stated.

Figure 4:
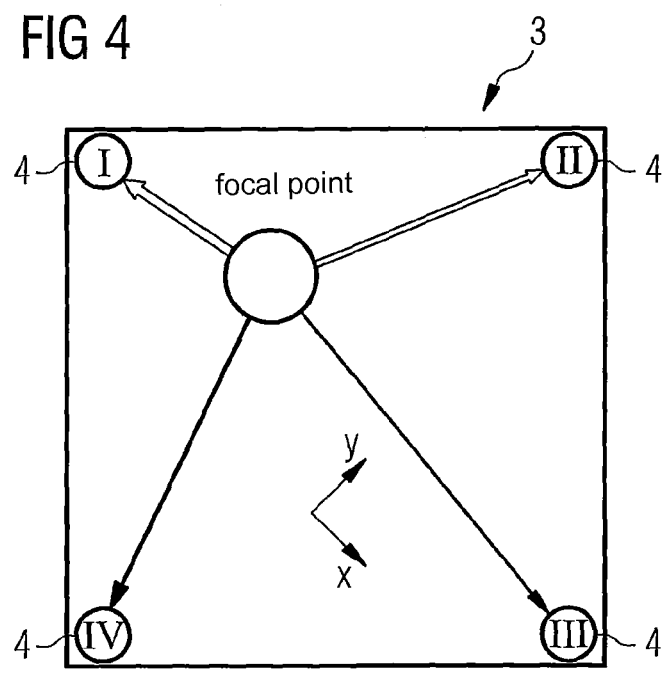
FIG. 4: the direction of both axes x and y in relation to the diodes of the position sensitive detector as well as a schematic representation of the incident radiation as well as of the generated photocurrents.

For the determination of the incidence angle of the radiation using the arrangement according to the embodiment, the incident radiation is imaged on the avalanche photodiodes 4 of the position sensitive detector 3 through the square-shaped opening 9 in the aperture structure, that is positioned using the diode assembly 5. The photons occurring on the avalanche photodiodes 4 are converted into a photocurrent there. For the avalanche photodiodes 4 respectively positioned opposite each other, the respectively irradiated sensitive area changes because of the shading that changes dependent on the incidence angle, and thus, the proportional to the irradiated surface photocurrent that is generated in the respective diode. This is schematically presented in FIG. 4.

This allows in turn the identification of the geometrical focal point of the incident sun radiation in both directions x and y with high precision as a measure for its incidence angle via the photocurrents of the four avalanche photodiodes 4 generated in this diode assembly 5. At the same time, the readout of the voltage values generated by the transimpedance amplifier from the currents takes place in an alternating manner to avoid a distortion of the field lines, and thus, of non-linearities; this takes place by reading out two respective avalanche photodiodes 4, that are diagonally opposite each other at one time as follows, whereby the single avalanche photodiodes 4 are designated as diodes I to IV:

At first, the diodes I and III of the position sensitive detector 3 are connected while the diodes II and IV remain floated. Following a stabilization period of 1 ms, the diodes I and III are read out and the corresponding voltages are stored ($U_I$ and $U_{III}$). Subsequently, the diodes II and IV of the position sensitive detector 3 are connected while diodes I and III remain floated. Following a stabilization period of 1 ms, the diodes II and IV are read out and the corresponding voltages are stored ($U_{II}$ and $U_{IV}$).

From these four voltages of the avalanche photodiodes 4 of the position sensitive detector 3, the electrical signal of the position of the geometrical focal point x and y of the incident radiation can be calculated according to $x=(U_{III}-U_I)/(U_I+U_{III})$ and $y=(U_{II}-U_{IV})(U_{II}+U_{IV})$. From these position signals, which can take on values between −1 and 1, the analogue output signals $A_x$ and $A_y$, which are consistent with the position of the focal point of the incident radiation (x,y) are calculated under the condition, that $U_{max}$ as the upper limit of the permissible voltage range is 3.0 V, and $U_{min}$ as the lower limit of the permissible voltage range is 0.3 V, as follows:

$$A_x=(x+1)*1.35V+0.3V;$$

$$A_y=(y+1)*1.35V+0.3V.$$

Thus in this embodiment according to the invention, four analogue output voltages are provided as characteristic values for the determination of the incidence angle ($A_x$ for the position of the geometrical radiation focal point in x-direction and $A_y$ for the position of the geometrical radiation focal point in y-direction) as well as for the determination of the radiation intensity of the incident radiation ($A_{PSD}$ for the sum of intensity of the incident radiation on the position sensitive detector 3 and $A_{blue}$ for the intensity of the radiation on the twilight sensor 7) freed of interferences for the output to external evaluation and control elements. In this described embodiment, the respective evaluation and control element is the computer of the air-conditioning system. There, the incidence angle of the sun radiation (azimuth and elevation angle) and the radiation intensity of the incident sun radiation freed of interferences are calculated from the signals for the focal point (x,y) of the incident radiation.

The invention claimed is:

1. Sensor for determination of an incidence angle of a radiation source, comprising:
   in a semiconductor layer, a diode assembly of avalanche photodiodes comprising a position sensitive detector, and an application specific integrated circuit for generation of analogue output signals that can be evaluated,
   a transparent distance layer for the adjustment of a distance, an aperture structure on the distance layer and comprising a defined opening in a non-transparent layer, and
   contact means for electrically connecting the sensor, wherein the diode assembly comprises n pairs of avalanche photodiodes with n=1, 2, 3 etc. arranged in such a way that the avalanche photodiodes are positioned axially symmetrically in relation to both axes x and y for the determination of the position of the incident radiation, and so that the opening of the aperture structure depending on the incidence angle of the radiation can be partly imaged on the avalanche photodiodes of this diode assembly respectively.

2. Sensor according to claim 1, wherein each avalanche photodiode arranged in pairs is arranged in one of 2n sectors of the diode assembly which are radially and regularly spanned around a geometrical focal point of the diode assembly, and wherein the avalanche photodiodes have separate, optically active areas across a small, isolated bridge area of same shape, same surface area and same distance from a center of the diode assembly.

3. Sensor according to claim 2, wherein n=2 and each of the four avalanche photodiodes is arranged in one quadrant of the diode assembly, and in plan view, have a basic shape, which is assembled from an equilateral triangle of side length a and a rectangle of the side length a joining at the side length a and $\sqrt{(3)}/2*a$, and that the four avalanche photodiodes are arranged to each other in such a way that respectively free tips of the equilateral triangles point towards each other, and the tips are as far away from each other that an electrical discharge from one diode to another is not possible.

4. Sensor for determination of an incidence angle of a radiation source, comprising:
   in a semiconductor layer, a diode assembly of avalanche photodiodes comprising a position sensitive detector, and an application specific integrated circuit for generation of analogue output signals that can be evaluated,
   a transparent distance layer for the adjustment of a distance, an aperture structure on the distance layer and comprising a defined opening in a non-transparent layer, and
   contact means for electrically connecting the sensor, wherein the opening is arranged above the diode assembly, and matches shape and size of the diode assembly as well as a thickness of the distance layer in such a way that consistently provides an imaging of incident radiation on at least one part of the diode assembly through the aperture structure, and thus, enables the determination of a position of a geometrical radiation focal point of the incident radiation.

5. Sensor according to claim 1, wherein all avalanche photodiodes are integrated monolithically on a semiconductor device.

6. Sensor according to claim 5, wherein the application specific integrated circuit and the contact means are integrated monolithically.

7. Sensor according to claim 5, wherein
   the light sensitive elements are arranged on a first semiconductor device and the application specific integrated circuit is arranged on a second semiconductor device, and
   the second semiconductor device is integrated in relation to the first semiconductor device in such a way that the second semiconductor device is underneath the first semiconductor device and is contacted via the first semiconductor device, and
   the contact means is arranged on the first and/or on the second semiconductor device.

8. Sensor according to claim 1, wherein the diode assembly contains additional means for the determination of total intensity of incident radiation.

9. Sensor for determination of an incidence angle of a radiation source, comprising:
in a semiconductor layer, a diode assembly of avalanche photodiodes comprising a position sensitive detector, and an application specific integrated circuit for generation of analogue output signals that can be evaluated,
a transparent distance layer for the adjustment of a distance, an aperture structure on the distance layer and comprising a defined opening in a non-transparent layer,
contact means for electrically connecting the sensor, and
a twilight sensor.

10. Sensor for determination of an incidence angle of a radiation source, comprising:
in a semiconductor layer, a diode assembly of avalanche photodiodes comprising a position sensitive detector, and an application specific integrated circuit for generation of analogue output signals that can be evaluated,
a transparent distance layer for the adjustment of a distance, an aperture structure on the distance layer and comprising a defined opening in a non-transparent layer, and
contact means for electrically connecting the sensor, wherein the distance layer comprises glass anodically bonded to the semiconductor layer.

11. Sensor according to claim 1, wherein the aperture structure is positioned in relation to a surface of the avalanche photodiodes at least with photolithographic precision.

12. Method for determination of incidence angle of a radiation source using a sensor, comprising a position sensitive detector with a diode assembly of avalanche photodiodes, an application specific integrated circuit for generating analogue output signals that can be evaluated in a linear manner, a transparent distance layer for adjusting a distance, and an aperture structure arranged on the distance layer and comprising a defined opening in a non-transparent layer, comprising following steps:
readout of single photocurrents, generated as a consequence of incident radiation on the avalanche photodiodes, through fluctuations in voltages, the incident radiation passing through the opening of the aperture structure on the diode assembly of the position sensitive detector
conversion of the voltages in the sensor into two continuous, electrical signals $A_x$ and $A_y$, which are consistent with a position of a geometrical focal point (x,y) of the radiation, and which are calculated from a quotient of differences and sums of the voltages generated in corresponding x and y directions, and consistent with the respective photocurrents, wherein:
$A_x$: position of geometrical radiation focal point in x-direction
$A_y$: position of geometrical radiation focal point in y-direction
calculating an azimuth and an elevation angle from the signals $A_x$ and $A_y$, which characterize the position of the radiation focal point by using corresponding tangent relations.

13. Method for the determination of the incidence angle of a radiation source according to claim 12, wherein the sensor comprises an assembly of four avalanche photodiodes, which are each in one quadrant of the position sensitive detector and readout of the photocurrents of the position sensitive detector converted into voltages as well as the calculation of the electrical signals $A_x$ and $A_y$, which are consistent with the position of the geometrical focal point (x,y) of the incident radiation when using a sensor with four avalanche photodiodes comprises:
connecting of a first pair of avalanche photodiodes, which are opposite each other along a x-direction, while the remaining diodes are kept floated;
keeping a stabilization period, during which the measurement conditions are reached;
readout of the photocurrents of said first pair and saving voltage values as $U_I$ and $U_{III}$;
connecting of a second pair of avalanche photodiodes, which are opposite each other along a x-direction, while the remaining diodes are kept floated;
keeping another stabilization period;
readout of photocurrents of said second pair and saving the voltage values $U_2$ and $U_4$;
calculating the position (x,y) according to $x=(U_{III}-U_I)/(U_I+U_{III})$ and $y=(U_{II}-U_{IV})/(U_{II}+U_{IV})$;

calculating the electrical signals $A_x$ and $A_y$ according to $A_x=(x+1)*(U_{max}-U_{min})/2+U_{min}$ and $A_y=(y+1)*(U_{max}-U_{min})/2+U_{min}$, whereby $U_{max}$ and $U_{min}$ designate the upper and lower limit of the respective permissible voltages of the electrical output signals;
calculating of the azimuth α and of the elevation angle β according to $$\alpha = \arctan\frac{2Ay - U\min - U\max}{2Ax - U\min - U\max}$$

$$\beta = \arctan\frac{1}{\sqrt{\left(\frac{2(Ax-U\min)}{U\max-U\min}-1\right)^2 + \left(\frac{2(Ay-U\min)}{U\max-U\min}-1\right)^2}}.$$

14. Method for the determination of the incidence angle of a radiation source according to claim 13, wherein the sensor contains additional means for determination of total intensity of the incident radiation, and further comprising: calculating total intensity of the radiation $A_{PSD}$ on the position sensitive detector.

15. Method for the determination of the incidence angle of a radiation source according to claim 14, wherein the total intensity of the radiation is calculated according to $A_{PSD}=(U_I+U_{II}+U_{III}+U_{IV})/4$ and/or determination of the intensity of the radiation on a twilight sensor takes place according to $A_{blue}=U_{blue}$.

16. Method for the determination of the incidence angle of a radiation source according to claim 13, wherein the sensor contains a twilight sensor, and further comprising: calculating the total intensity of the radiation on the position sensitive detector ($A_{PSD}$) and/or intensity of radiation $A_{blue}$ on the twilight sensor.

17. Method for the determination of the incidence angle of a radiation source according to claim 16, wherein the determination of the intensity of the radiation on the twilight sensor takes place according to $A_{blue}=U_{blue}$.

* * * * *